(12) United States Patent  
Chung

(10) Patent No.: US 7,284,799 B2
(45) Date of Patent: Oct. 23, 2007

(54) ARMREST TILTING DEVICE

(75) Inventor: Hae Il Chung, Inchon (KR)

(73) Assignee: Woobo Tech Co., Ltd., Kyunggi-Do (KR)

( * ) Notice: Subject to any disclaimer, the term of this patent is extended or adjusted under 35 U.S.C. 154(b) by 158 days.

(21) Appl. No.: 10/555,900

(22) PCT Filed: Apr. 30, 2004

(86) PCT No.: PCT/KR2004/001012

§ 371 (c)(1),
(2), (4) Date: Nov. 7, 2005

(87) PCT Pub. No.: WO2004/098946

PCT Pub. Date: Nov. 18, 2004

(65) Prior Publication Data

US 2007/0007811 A1    Jan. 11, 2007

(30) Foreign Application Priority Data

May 7, 2003    (KR) .................... 10-2003-0028927

(51) Int. Cl.
*B60N 2/46* (2006.01)
(52) U.S. Cl. ............................ 297/411.38; 297/411.32
(58) Field of Classification Search ................ 297/113, 297/115, 411.32, 411.38
See application file for complete search history.

(56) References Cited

U.S. PATENT DOCUMENTS

| 4,621,864 | A | * | 11/1986 | Hill ............................ 297/115 |
| 4,655,501 | A | * | 4/1987 | Ishigami et al. ............ 297/113 |
| 5,106,160 | A | * | 4/1992 | Nomura et al. ........ 297/411.32 |
| 5,489,143 | A | * | 2/1996 | Adachi et al. ......... 297/411.38 |
| 5,597,209 | A | * | 1/1997 | Bart et al. ............. 297/411.38 |
| 5,702,157 | A |   | 12/1997 | Hurite |
| 6,106,068 | A |   | 8/2000 | Lefevere |
| 6,533,353 | B2 | * | 3/2003 | Johnston ................ 297/411.38 |
| 7,100,242 | B2 | * | 9/2006 | Maierholzner ......... 297/411.32 |
| 2002/0070597 | A1 | * | 6/2002 | Liu ........................ 297/411.38 |
| 2002/0096928 | A1 | * | 7/2002 | Bidare .................... 297/411.32 |

FOREIGN PATENT DOCUMENTS

DE    4022840    1/1992

* cited by examiner

*Primary Examiner*—Peter R. Brown
(74) *Attorney, Agent, or Firm*—Dilworth & Barrese LLP

(57) ABSTRACT

A device for adjusting the inclination of the armrest by combined operation of the gear and cam mechanisms is provided. The device comprises a housing a ratchet member (12), a check member, a pivot control device comprising a fixed cam (22), a rotational com (24) and a torsion coil spring (32).

18 Claims, 12 Drawing Sheets

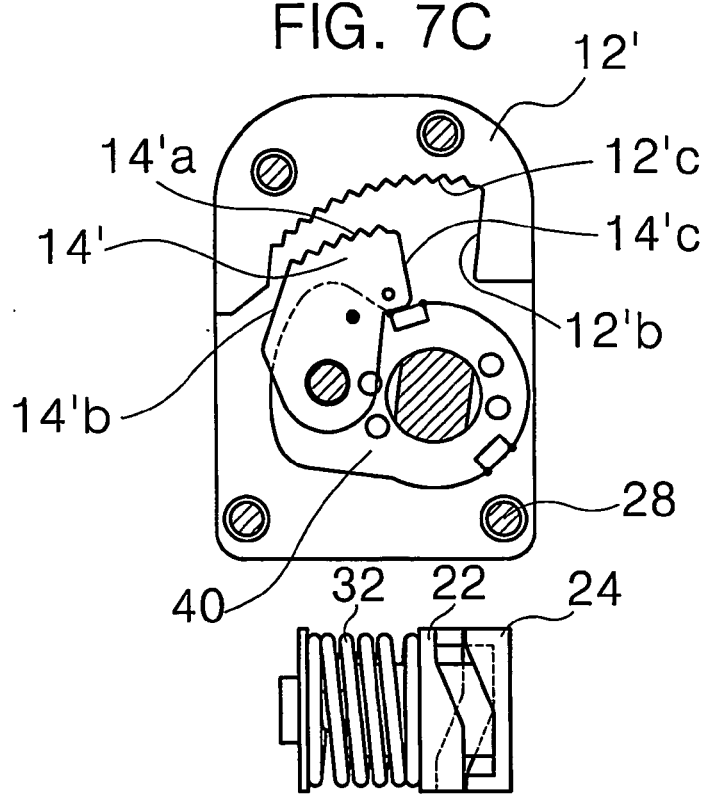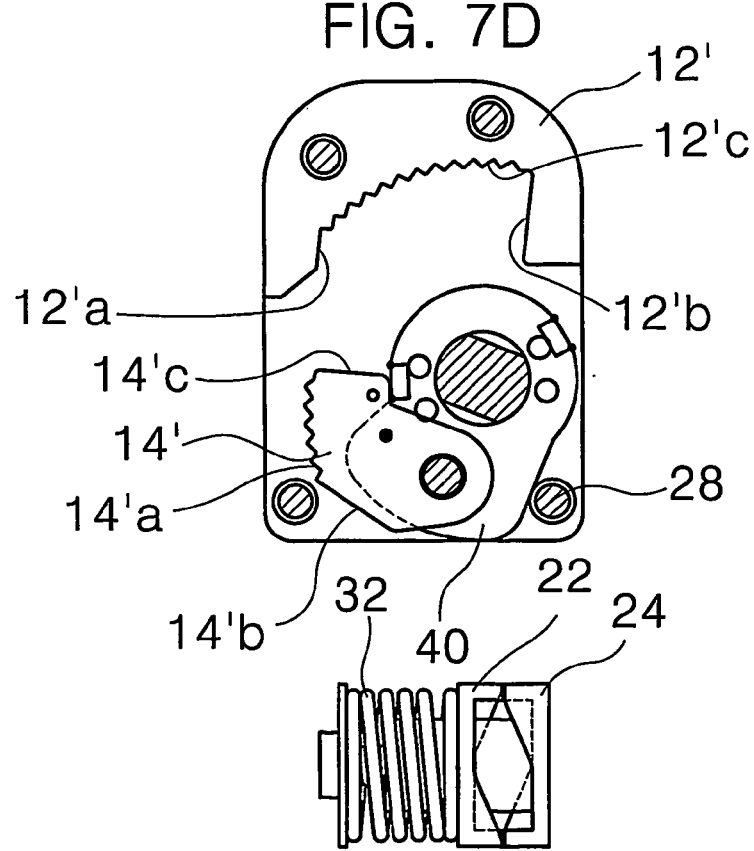

ARMREST TILTING DEVICE

TECHNICAL FIELD

The present invention relates to an armrest tilting device, and more particularly, to an armrest tilting device wherein the gradient of the rest bar may be adjusted by a step by step tilting operation of the rest bar.

BACKGROUND ART

Armrests are generally used to rest an arm of an occupant of a seat or a passenger of an automobile. A conventional armrest for automobile seat, for example, is placed on an automobile seat so that an occupant can put her/his arm on it or positioned parallel with the back of the automobile seat by pivoting it upward when not in use.

Conventional armrests have a problem in that its inclination may not be adjusted, even if the occupant wants so for reading or taking a comfortable posture.

DISCLOSURE OF INVENTION

The present invention is made to solve the aforementioned problem. Accordingly, an object of the present invention is to provide an armrest tilting device, made by combination of the gear and cam mechanisms wherein the armrest can be tilted stepwise at predetermined angular intervals for the convenience of the occupant.

According to the present invention for achieving the above object and others, there is provided an armrest tilting device, comprising a housing comprising an outer panel with a supporting hole and an inner panel with a passage hole, the two panels of which are coupled with a gap therebetween and in parallel with each other; a ratchet member which is arranged between the parallel panels and formed with a plurality of teeth and a jaw; a check member comprising a pivotable gear formed with a jaw and teeth for engaging with the jaw and teeth of the ratchet member and a torsion coil spring elastically supported on the pivotable gear, a rotational shaft which is rotatably supported in the supporting hole of the outer panel of the housing and passes through the passage hole of the inner panel of the housing, carrying either the ratchet member or the pivotable gear and a rest bar of the armrest fixed on one end thereof, and a pivoting control device arranged on the rotational shaft outside the inner panel of the housing.

The pivoting control device is preferably comprised of a fixed cam, which is provided with a passage hole, one side of which is attached to the inner panel of the housing so as for the two adjoining passage holes to be in alignment with each other, and the other side of which is formed with two recesses having a wall and a slant facing each other, a rotational cam which is formed with two protrusions to be engaged respectively with the recesses of the fixed cam and fixed on the rotational shaft, a second torsion coil spring wounded around the rotational shaft and arranged between the rotational cam and the other end of the rotational shaft.

According to one aspect of the present invention, the ratchet member is fixed on the rotational shaft passing through its fixing hole, the pivotable gear is fixed between the outer and inner panels by means of a pivot and the first torsion coil spring is hooked between the pivotable gear and the inner surface of one of the parallel panels.

According to another aspect of the present invention, the ratchet member is fixed on the inner surface of one of the outer and inner panels, the pivotable gear is fixed on the rotational shaft via a support having a mounting hole in which the shaft is fixed and the first torsion coil spring is hooked between the pivotable gear and the support for the pivotable gear.

BRIEF DESCRIPTION OF THE DRAWINGS

FIGS. 7a to 7d are sectional views showing the operation of the armrest tilting device of FIG. 5.

BEST MODES FOR CARRYING OUT THE INVENTION

Hereinafter, preferred embodiments of the present invention will be described in detail with reference to the accompanying drawings.

EMBODIMENT 1

Figure 1:
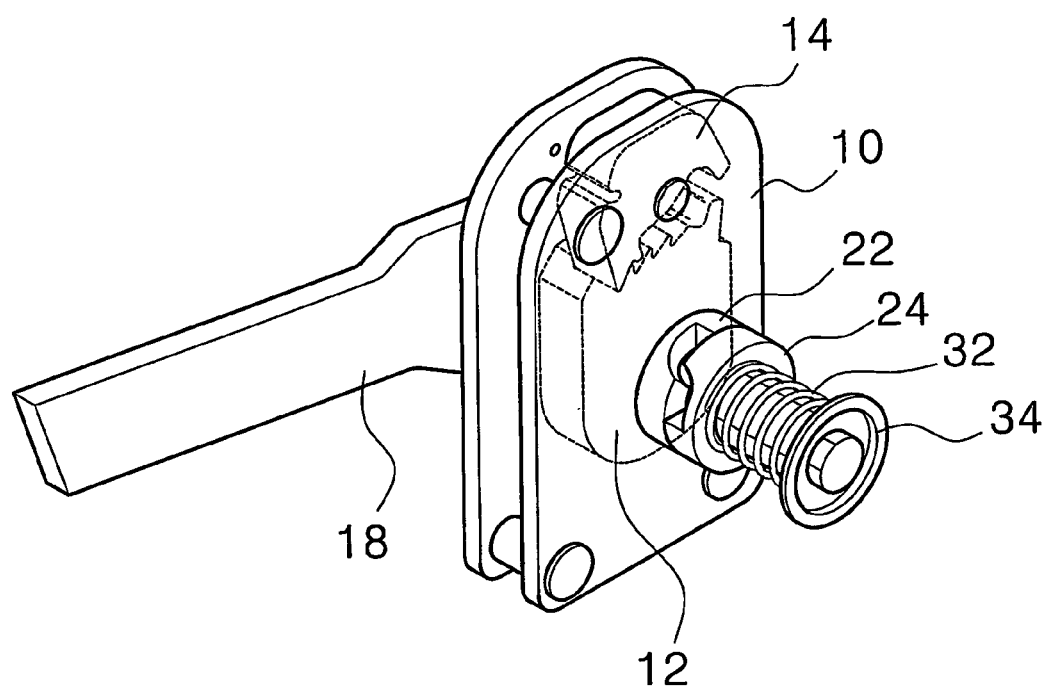
FIG. 1 is a perspective view showing an armrest tilting device according to an embodiment of the present invention.
Figure 2:
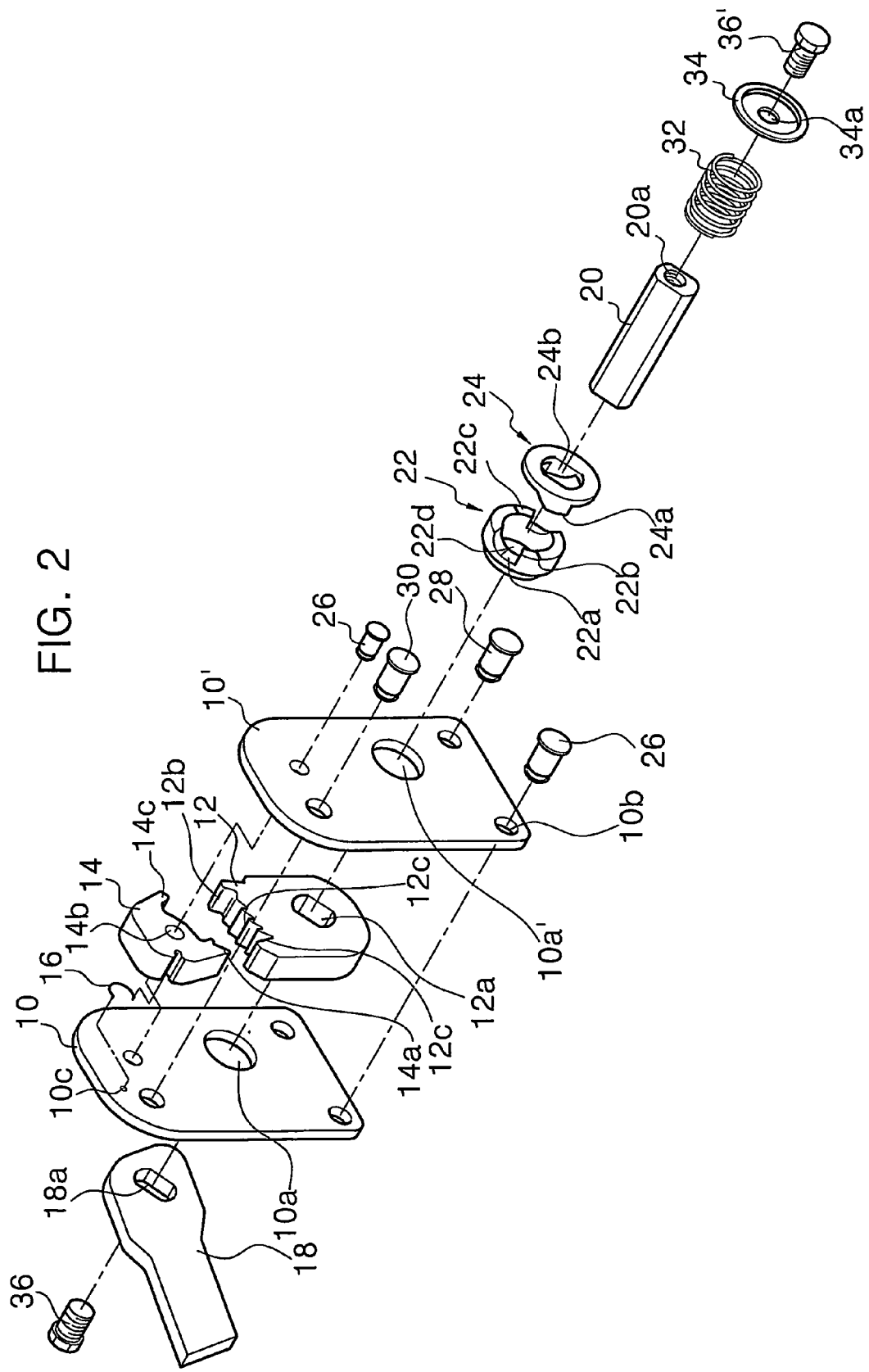
FIG. 2 is an exploded perspective view of the armrest tilting device of FIG. 1.
Figure 3A:
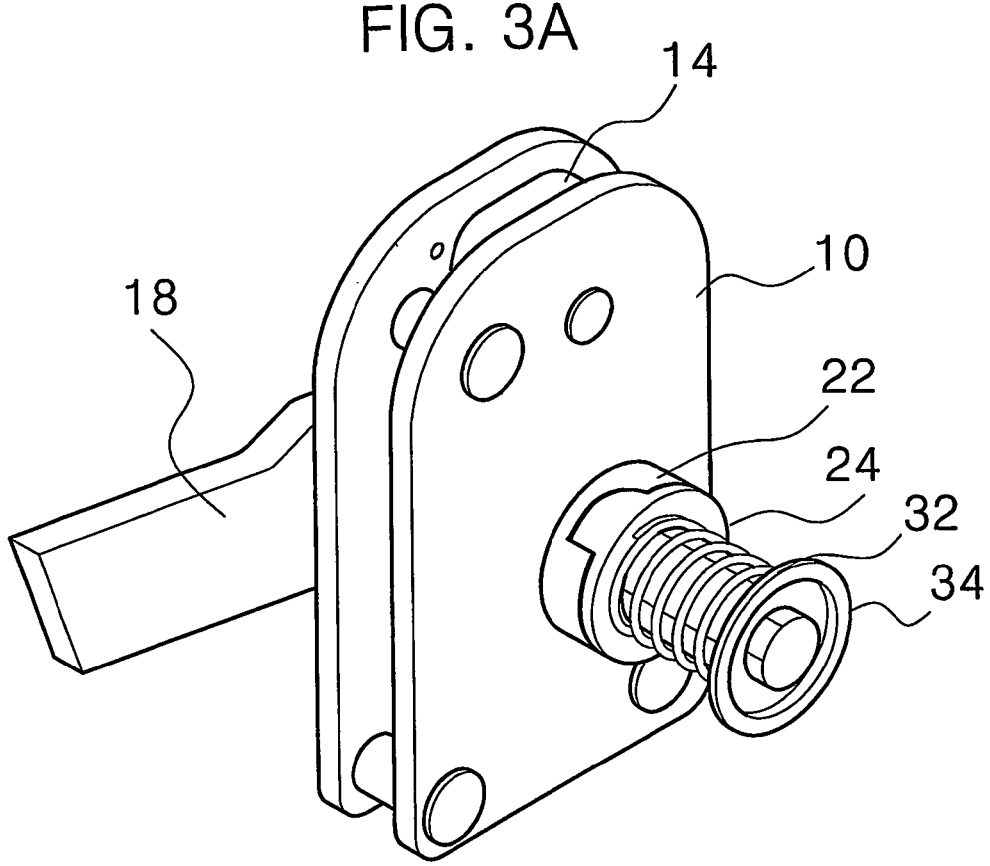
FIGS. 3a to 3c are perspective views illustrating the operation of the armrest tilting device of FIG. 1.
Figure 3B:
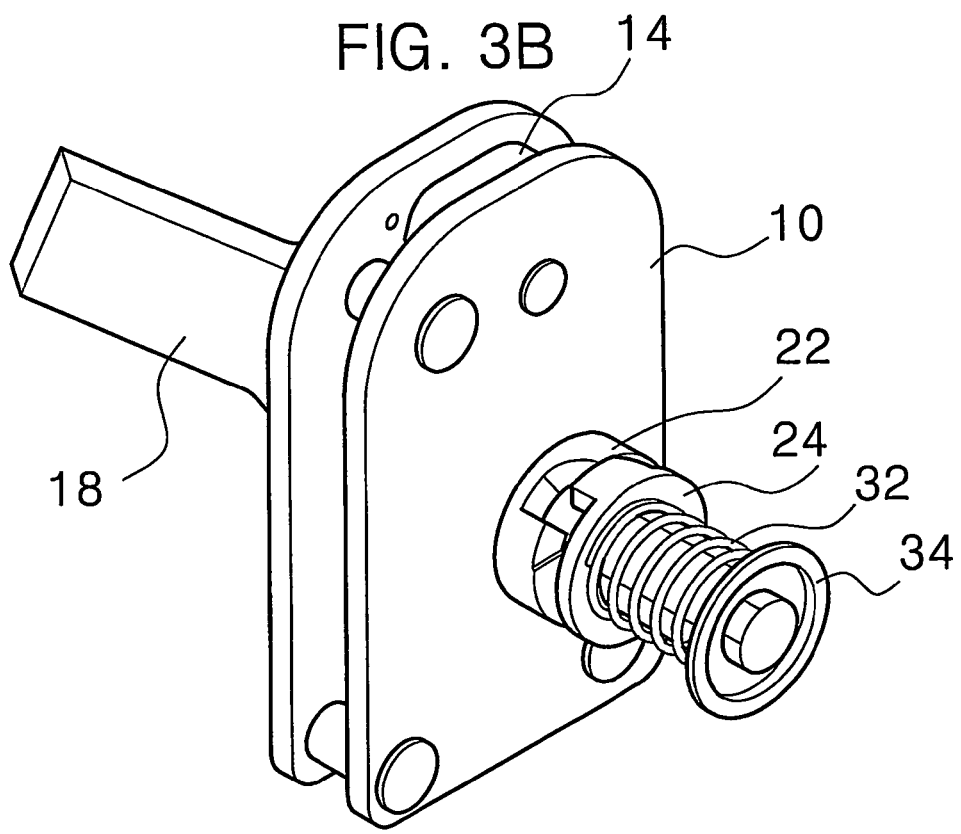
Figure 3C:
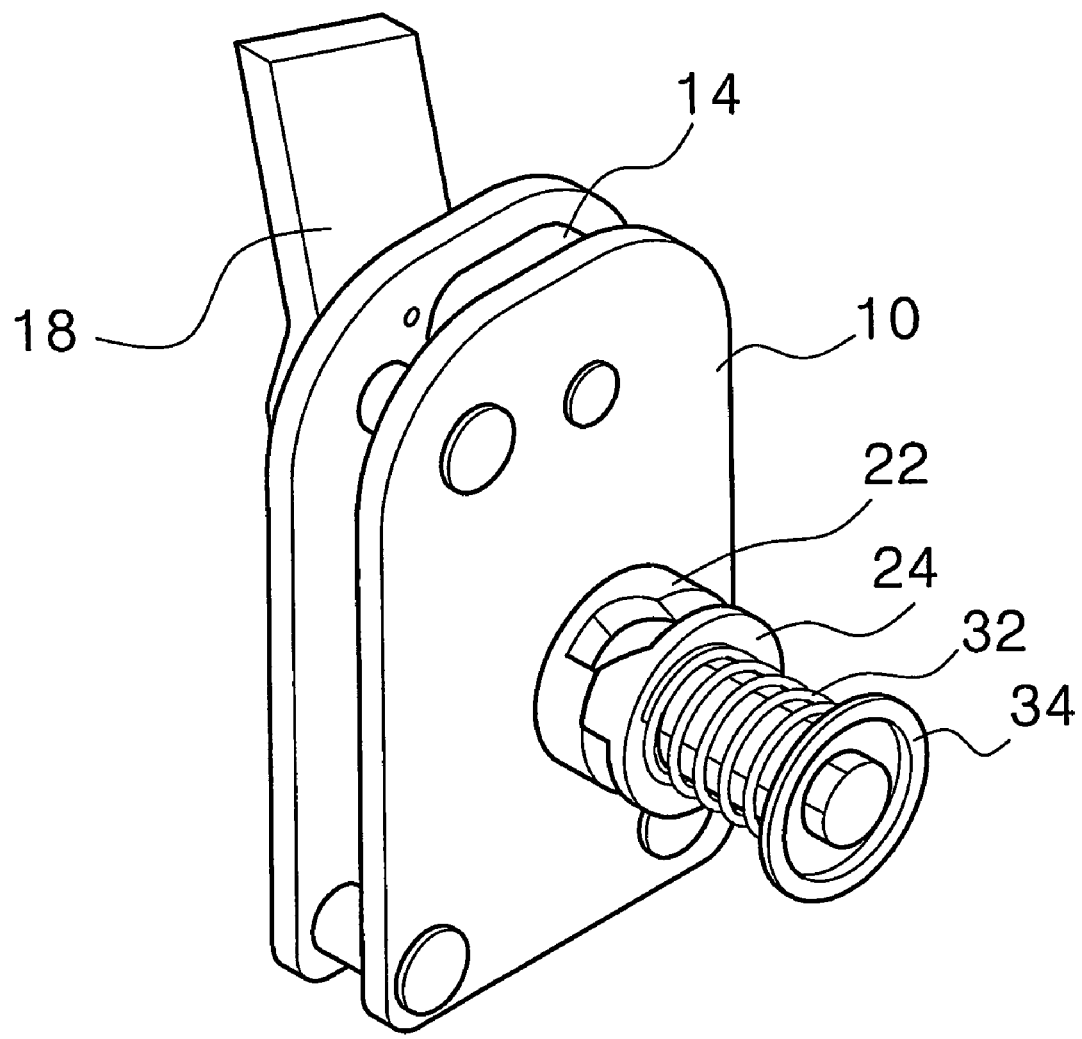

As shown in FIGS. 1 and 2, an armrest tilting device according to the first embodiment of the present invention comprises a housing comprising an outer panel 10 with a supporting hole 10a and an inner panel 10' with a passage hole 10a' the two panels of which are coupled with a gap therebetween and in parallel with each other, a ratchet member 12 interposed between the outer and inner panels 10, 10' and formed with a supporting hole 12a, a plurality of teeth 12c and two jaws 12b, 12c a check member comprising a pivotable gear 14 with teeth 14a for engaging with the teeth 12a of the ratchet member 12 and a jaw 14b and a first torsion coil spring 16 interposed between the inner surface of the inner panel 10' of the housing, a rotational shaft 20 which is rotatably supported in the supporting hole of the outer panel 10 of the housing and passes through the passage hole 10'a of the inner panel 10' of the housing, carrying a rest bar 18 of the armrest fixed on one end thereof and the ratchet member 12 fixed thereon with its mounting hole 12a and a pivoting control device comprising a fixed cam 22, a rotational cam 24 and a second torsion coil spring 32 and arranged on the rotational shaft 20 opposite the inner panel 10' of the housing.

The outer and inner panels 10, 10' are formed with a supporting hole 10a and a passage hole 10a' and four fastening holes 10b at the corners respectively and arranged apart by a certain gap to seat the ratchet member 12 and the pivotable gear 14 therein by means of fixing means (rivets, bolts or the like) inserted and fixed in the respective fastening holes 10b, while a hanging hole 10c is provided on the inner surface of the outer panel 10 so that the other end of the first torsion coil spring 16 is hooked therein.

The supporting hole 10a of the outer panel 10 of the housing may have a ball bearing or the like to support the rotational shaft 20.

The rivets fixed in the holes 10b at the lower and upper ends of the outer and inner panels 10, 10' in the vicinity of the ratchet member 12 and the pivotable gear 14 have the function as a stopper 28, 30 for preventing the excessive pivoting of the ratchet member 12 and the pivotable gear 14, respectively.

The ratchet member 12 is formed with an elliptical fixing hole 12a to fixedly receive the rotational shaft 18 therethrough, while the plurality of teeth 12c travel and engage with teeth 14a of the pivotable gear 14.

The pivotable gear 14 is formed with a hole 14b for receiving a pivot 26 so that the pivotable gear 14 can be pivotably arranged between the outer and inner panels 10, 10'. The pivotable gear 14 is provided with teeth 14a for engaging with teeth 12c of the ratchet member 12, and a jaw 14c.

The first torsion coil spring 16 has the shape of an open ring and resiliently supports the pivotable gear 14 against the ratchet member 12 so that the teeth 12a and 14a of the ratchet member 12 and the pivotable gear 14 may be engaged with and disengaged from each other.

The first torsion coil spring 16 is disposed between the outer panel 10 and the pivotable gear 14 and both ends of the spring 16 are hooked in the hanging holes on the panel 10 and the pivotable gear 14. An end of the first torsion coil spring 16 may, of course, be hooked on the inner panel 10' instead of the outer panel 10.

The rotational shaft 20 in the shape of a rod is provided with a screw hole 20a at its both ends and rotatably and rigidly held in the two supporting holes 10a and 24b of the outer panel 10 and the rotational cam 24.

One end of the rest bar 18 which adjoins the outer panel 10 is formed with an elliptical fixing hole 18a and fixed on one end of the rotational shaft 20 by means of a bolt 36 inserted in the screw hole 20a, while the other part of the rest bar 18 is used as a handle for pivoting the armrest. The rest bar 18 is preferably covered with a soft material as the material of the seat.

In the pivoting control device, which also serves to prevent the rest bar 18 from rocking during the tilting operation of the armrest, the fixed cam 22 attached to the inner panel 10' is provided with a passage hole 22d for the rotational shaft 20 as well as a vertical surface 22b and a step 22c on its outer protruded circumference at its outer cam portion.

The opposite two protrusions 24a of the rotational cam 24 have a precipice or wall and a slant so that they may engage with the corresponding recesses 22a of the fixed cam 22, while the rotational cam 24 is fixed on the rotational shaft 20 by means of a supporting hole 24b receiving the shaft 20 therein.

The second torsion coil spring 32 is wound around the rotational shaft 20 and disposed between the rotational cam 24 and a washer 34 fixed on the other end of the shaft 20 by a bolt 36' to urge the rotational cam 24 toward the fixed cam 22.

Figure 8:
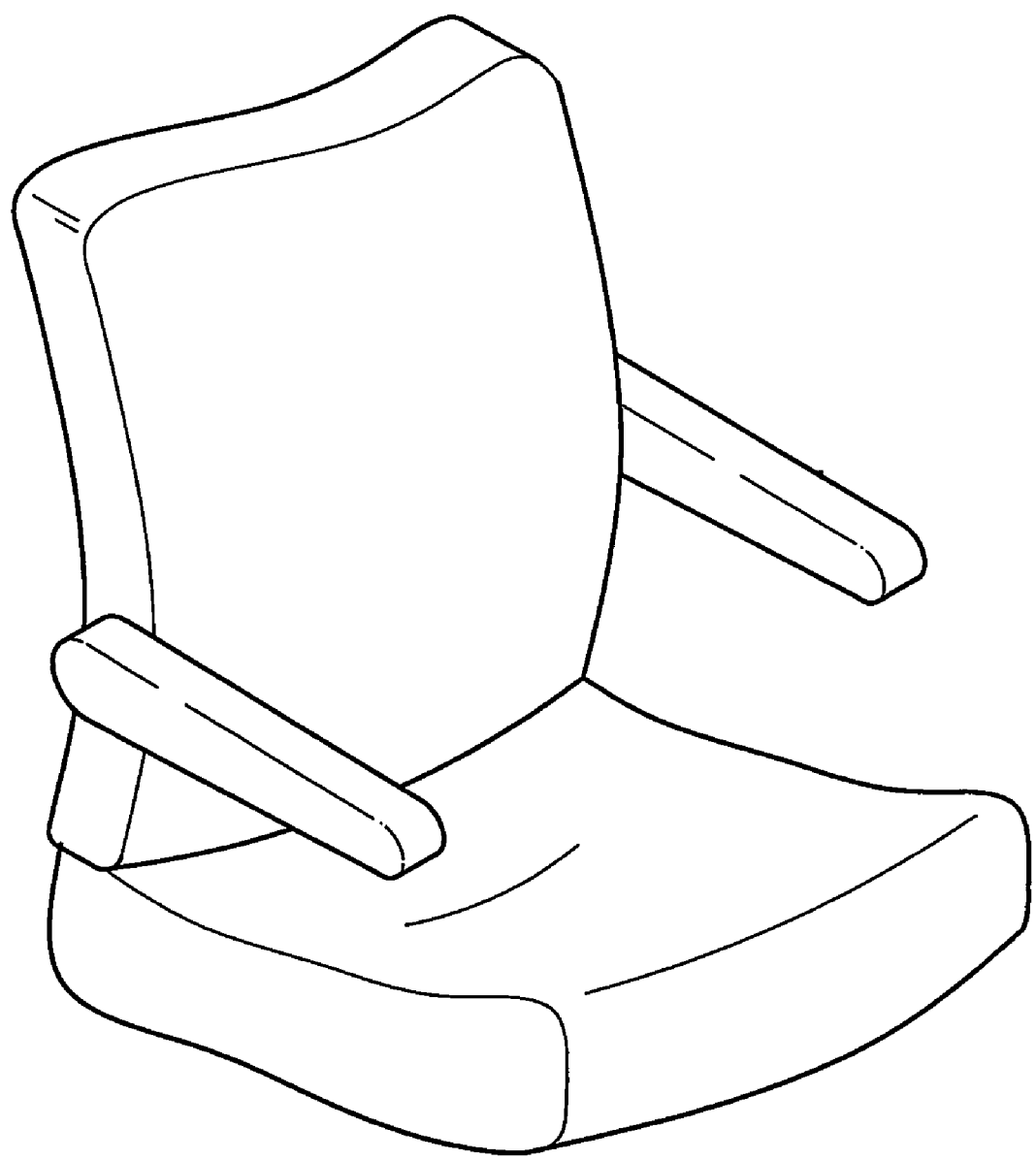
FIG. 8 is a perspective view of a seat equipped with the armrest tilting devices of the present invention.

The armrest to which the present invention is applied may be mounted on the seat as shown in FIG. 8

Now, the operation of the armrest tilting device of the first embodiment of the present invention will be described.

Figure 4A:
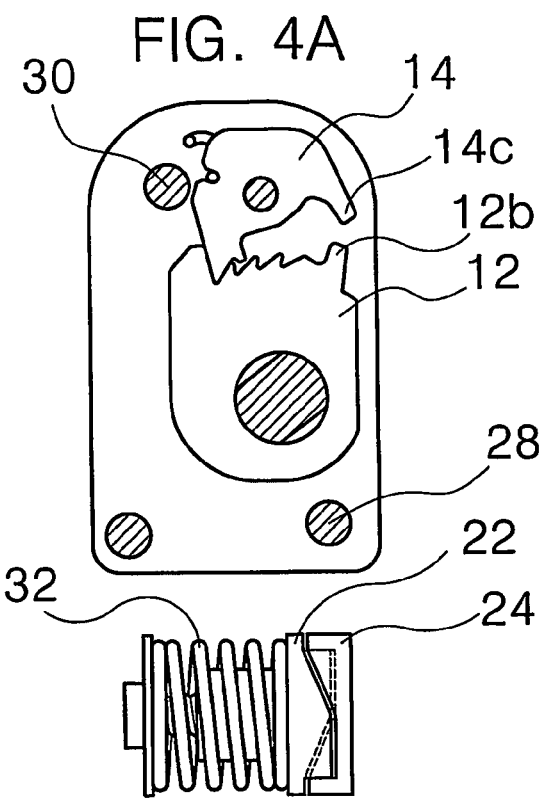
FIGS. 4a to 4e are sectional views illustrating the operation of the armrest tilting device of FIG. 1.

When the armrest is placed parallel with the seat, teeth 14a of the pivotable gear 14 engage with the front part of the teeth 12a of the ratchet member 12, while the fixed cam 22 and the rotational cam 24 fit with each other with the protrusions 24a of the rotational cam 24 received in the recesses 22a of the fixed cam 22 (see FIG. 4a).

Figure 4B:
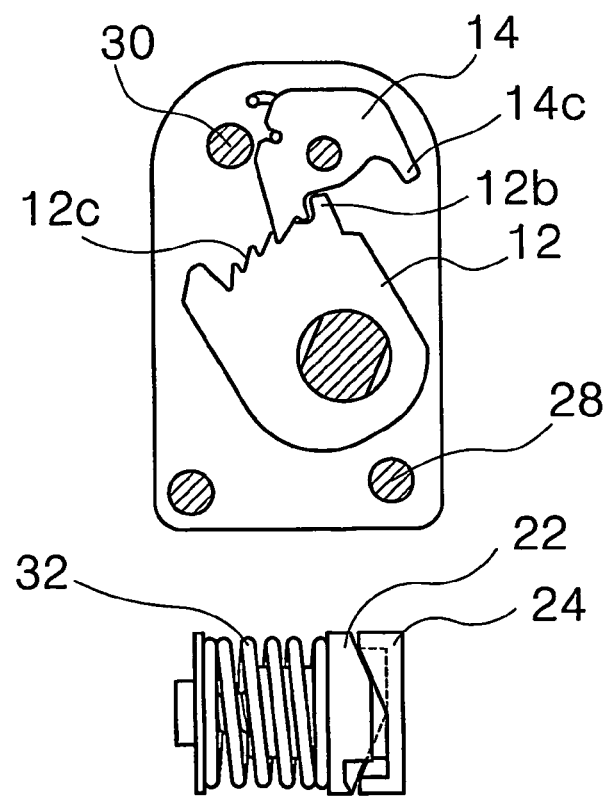

When the rest bar 18 is pulled upwardly, the rotational shaft 20 and the ratchet member 12 are simultaneously rotated counterclockwise as can be seen from FIG. 4b.

The teeth 14a of the pivotable gear 14 travel and engage with rear teeth 12a of the ratchet member 12 stepwise, making the rest bar 18 to be tilted stepwise (four times in FIG. 4b) upwardly. The slants of the protrusions 24a of the rotational cam 24 slide on or climb the corresponding slant of the recesses 22a of the fixed cam 24, making the second torsion coil spring 32 to be compressed (see FIG. 4b).

The teeth of the ratchet member 12 and the pivotable gear 14 of this embodiment are desirably designed so that the rest bar 18 and the armrest as a whole may be tilted stepwise upwardly by 10 degrees through one step, i.e. 40 degrees by four steps.

When teeth 14a of the pivotable gear 14 meet and engage with the jaw 12b of the ratchet member 12, the latter thrust the former forward, making the pivotable gear 14 to be pivoted clockwise and disengaged from the ratchet member 12. The pivotable gear 14 is then maintained in the pivoted position under the influence of the first torsion coil spring 16.

Figure 4C:
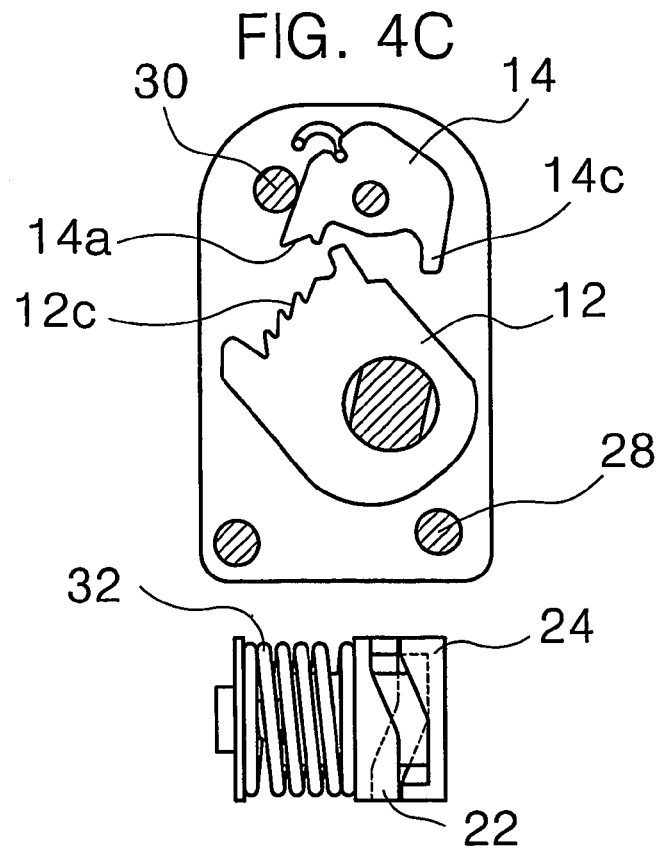

The further clockwise pivoting of the pivotable gear 14 is checked by the stopper 30. In this state, the fixed cam 22 and the rotational cam 24 are in contact with each other as shown in FIG. 4c.

Figure 4D:
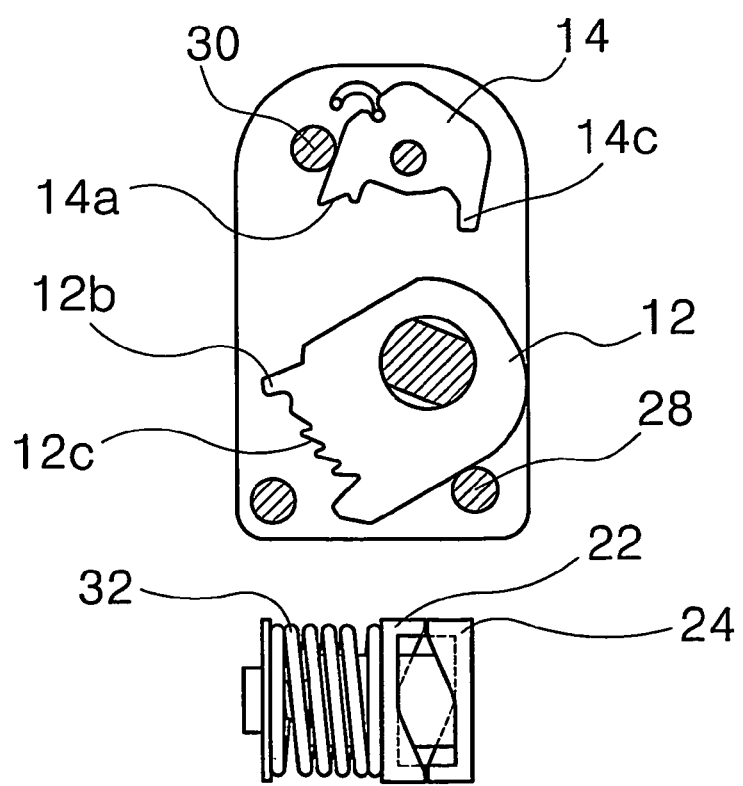

Thereafter, the ratchet member 12 and also the rest bar 18 are rotated without being checked by the check member of the pivotable gear 14 and the first torsion coil spring 16 until it comes to meet the stopper 28 (see FIG. 4d).

In this state, the rest bar 18 is further pivoted upwardly and thus the top surfaces of the protrusions 24a of the rotational cam 24 slide on the corresponding top surface of the fixed cam 22 until they are placed on the corresponding step 22c formed thereon, as shown in FIG. 4d and pivoting of the rest bar 18 is stopped as it reaches a position in parallel with the back of the seat. The free downward pivoting of the rest bar 18 is checked, as the top surface the rotational cam 24 is pressed against the step 22c of the fixed cam 22 by the second torsion coil spring 32.

When the rest bar 18 is to be returned to a position for the occupant's use, the top surfaces of protrusions 24a of the rotational cam 24 must cross over the vertical surface 22b of the respective step 22c and the force for starting the pivoting motion of the rest bar 18 should be bigger than that of the second torsion coil spring 26 pressing the top surfaces of the protrusions 24a of the rotational cam 24 against the top surfaces of the fixed cam 22.

Figure 4E:
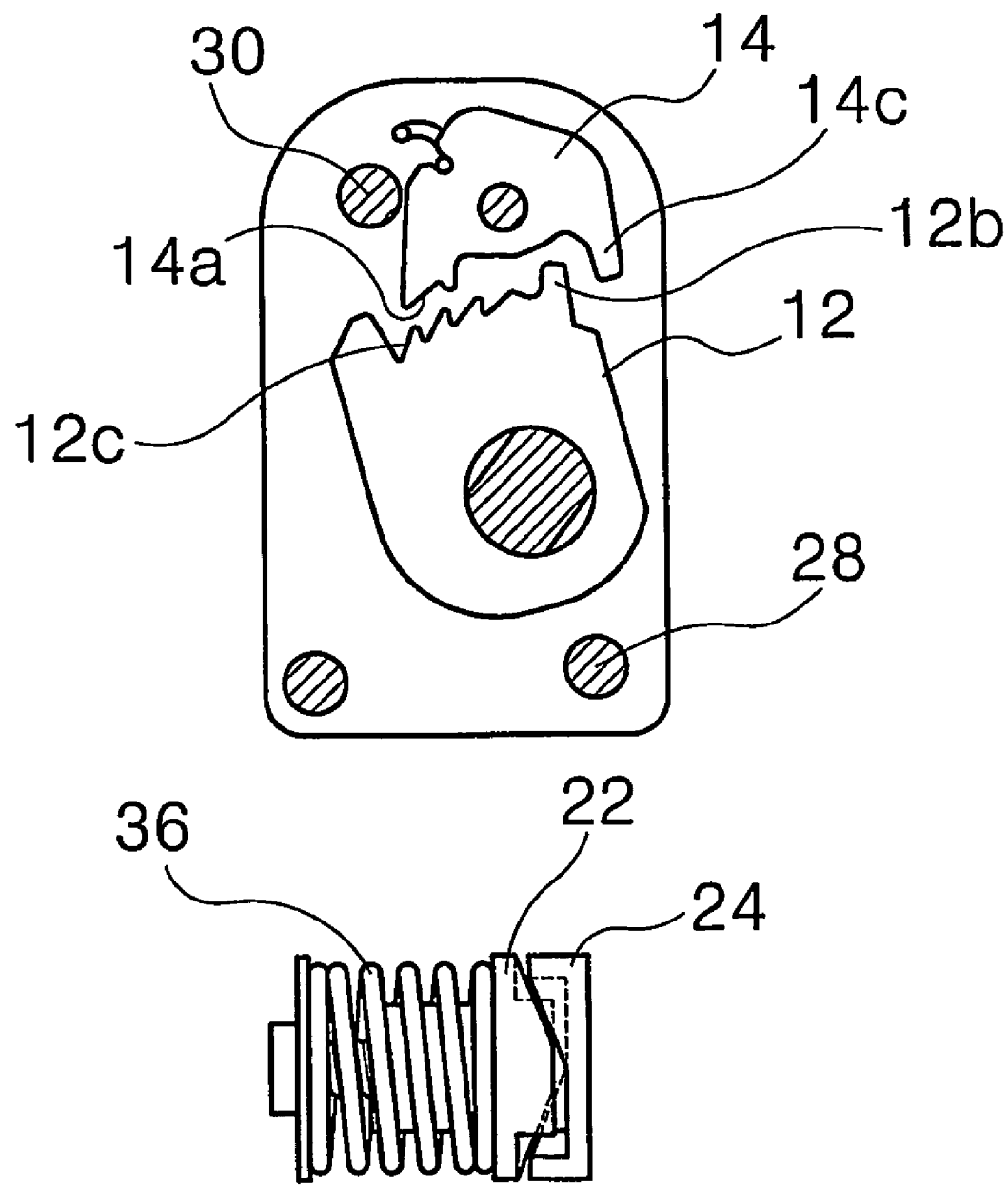

After the top surfaces of the protrusions 24a of the rotational cam 24 have crossed over the vertical surface 22b of the corresponding step 22c of the fixed cam 22, they are forced to slide on the rest portion of the top surface of the fixed cam 22 and the protrusions 24a of the rotational cam 24 go readily into the recesses 22a of the fixed cam 22 and the ratchet member 22 is pivoted clockwise as can be seen from FIG. 4e.

As the rotation of the fixed cam 22 is continued and its jaw 12b comes to meet the jaw 14c of the pivotable gear 14, the former pushes the latter backward, making the pivotable gear 14 to be pivoted counterclockwise so that its teeth 14c may engage with the front part of the teeth 12a of the ratchet member 12 as shown in FIG. 4a.

EMBODIMENT 2

Figure 5:
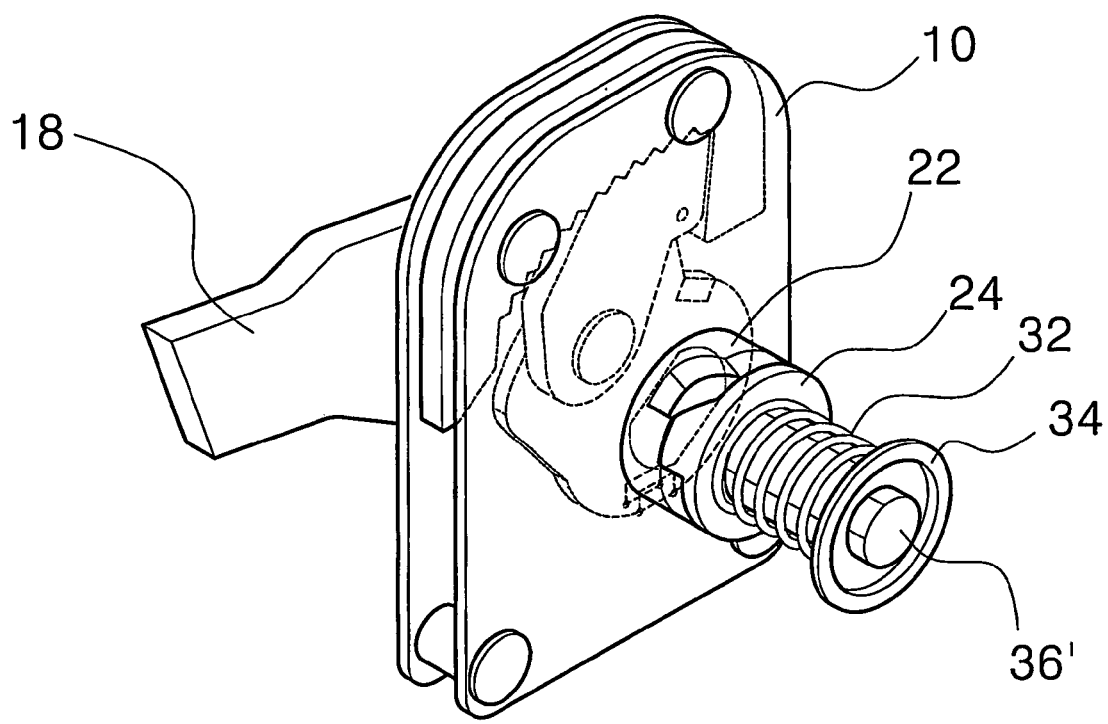
FIG. 5 is a perspective view showing an armrest tilting device according to another embodiment of the present invention.
Figure 6:
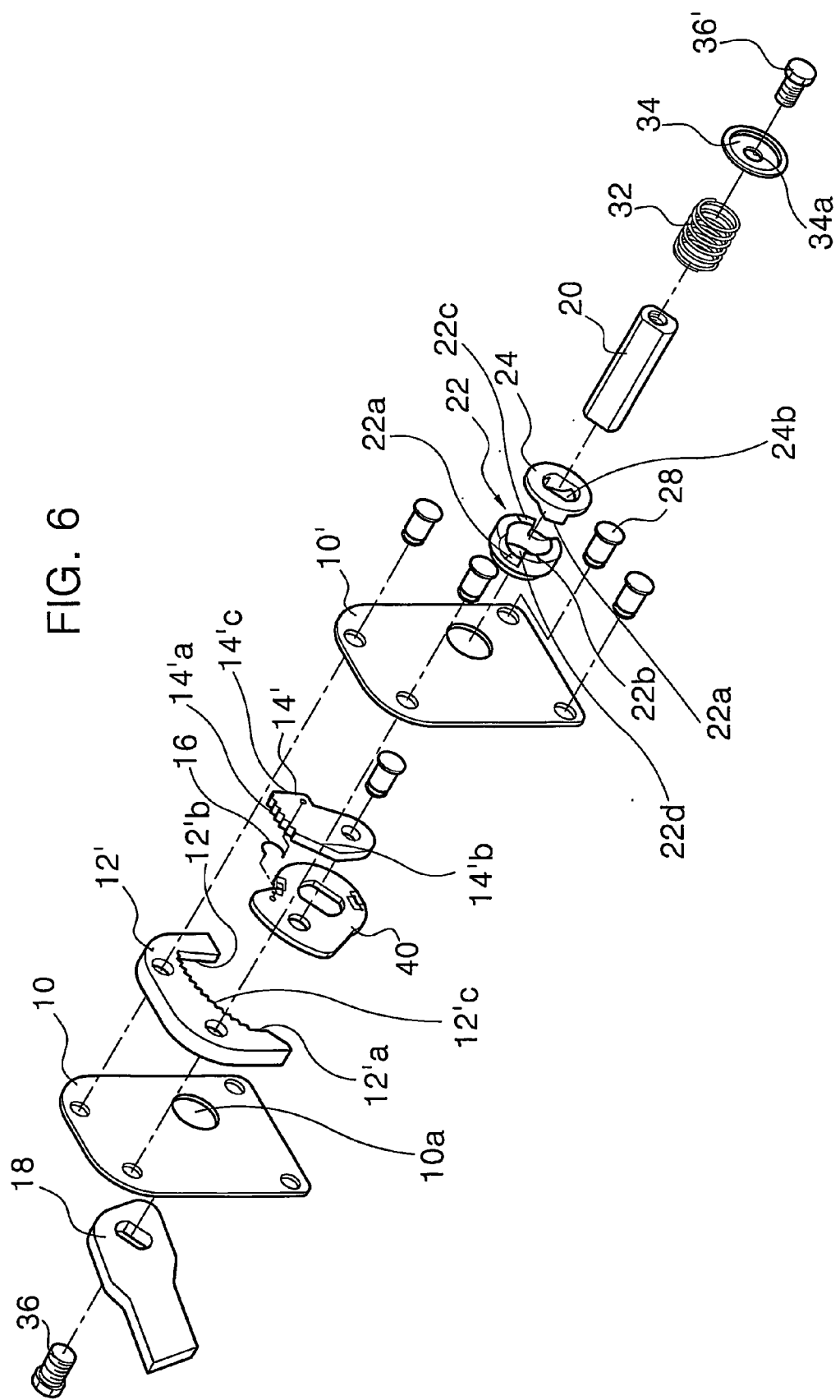
FIG. 6 is an exploded perspective view of the armrest tilting device of FIG. 5.

FIGS. 5 and 6 show an armrest tilting device according to the second embodiment of the present invention, In this embodiment, the structure of the armrest tilting device is the same as that of the previous embodiment, except that a ratchet member 12' having a plurality of teeth 12'c and two opposite jaws 12'b, 12'c is fixed between the outer and inner panels 10, 10' of the housing, a support 40 mounted on the rotational shaft 20 and pivotably holding the pivotable gear 14' having teeth 14'a and opposite jaws 14'a, 14'b and the first torsion coil spring 16 is resiliently supported between the support 40 and the pivotable gear 14'.

In FIGS. 5 and 6, the same elements as those of the first embodiment are represented by the same reference numerals and symbols while the descriptions for the same elements as those of the first embodiment apply to the second embodiment as well.

Now, the operation of the armrest tilting device of the second embodiment of the present invention will be described.

When the armrest is placed parallel with the seat, teeth 14'a of the pivotable gear 14', which is pivotably mounted on the support 40, engage with the front part of the teeth 12'c of the ratchet member 12', while the fixed cam 22 and the rotational cam 24 fit with each other with the protrusions 24a of the rotational cam 24 received in the recesses 22a of the fixed cam 22 (see FIG. 7a), in the same way as shown in FIG. 4a.

Figure 7A:
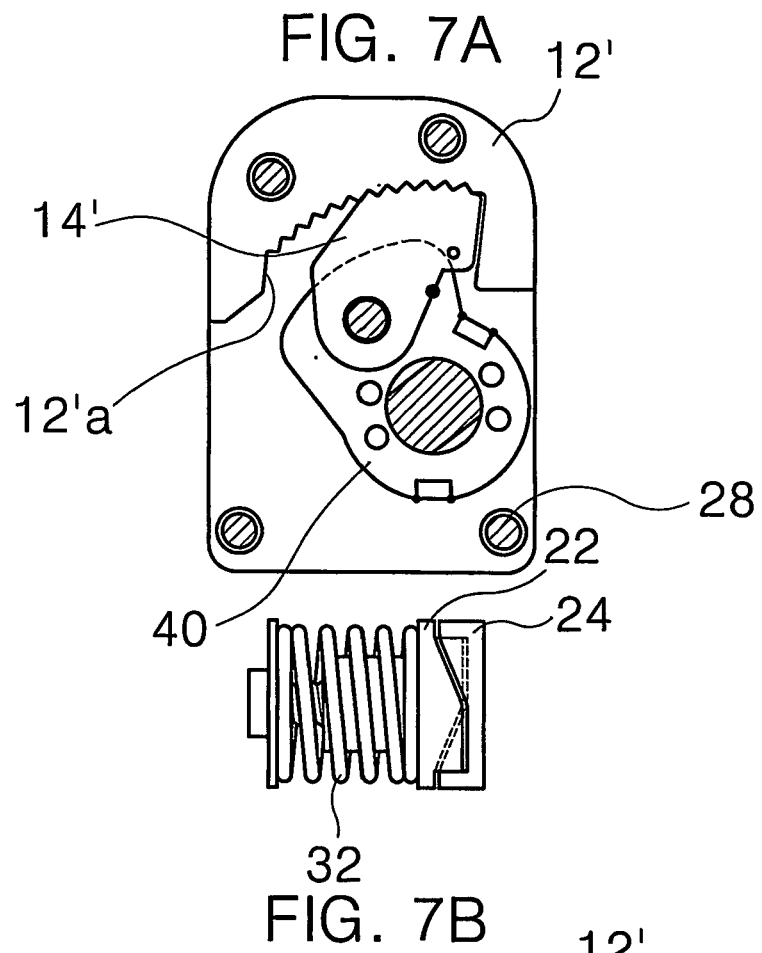
Figure 7B:
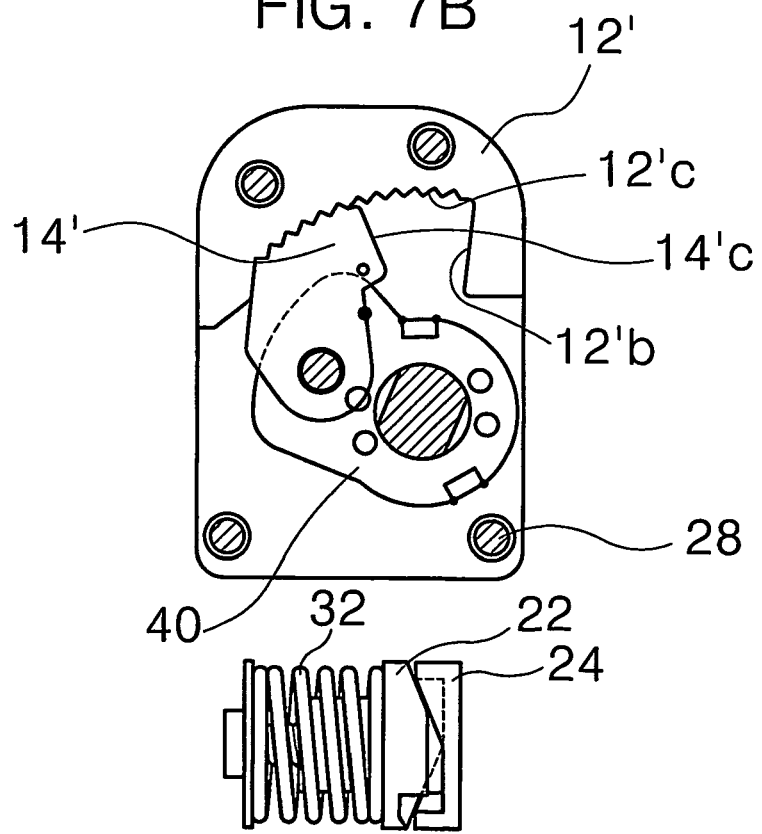

When the rest bar 18 is pulled upwardly, the rotational shaft 20 and the pivotable gear 14' are simultaneously rotated counterclockwise as can be seen from FIG. 7b.

The teeth 14'a of the pivotable gear 14' travel and engage with rear teeth 12'c of the ratchet member 12' stepwise, making the rest bar 18 to be tilted stepwise (five times in FIG. 7b) upwardly. The slants of the protrusions 24a of the rotational cam 24 slide on or climb the corresponding slant of the recesses 22a of the fixed cam 22, making the second torsion coil spring 32 to be compressed (see FIG. 7b), in the same way as shown in FIG. 4b.

The teeth of the ratchet member 12' and the pivotable gear 14' of this embodiment are desirably designed so that the rest bar 18 and the armrest as a whole may be tilted stepwise upwardly by 10 degrees through one step, i.e. 50 degrees by five steps.

When the jaw 14'b of the pivotable gear 14' meet and engage with the jaw 12'a of the ratchet member 12', the latter prevent the former from traveling further, making the pivotable gear 14' to be pivoted clockwise and disengaged from the ratchet member 12'. The pivotable gear 14' is then maintained in the pivoted position under the influence of the first torsion coil spring 16 (see FIG. 7c).

Thereafter, the pivotable gear 14' and also the rest bar 18 are rotated without being checked by any other elements until the support 40 for the pivotable gear comes to meet the stopper 28 (see FIG. 7d).

In this sate, the pivot control device is operated in the same way as that of the first embodiment, as shown in FIGS. 4d and 4e.

As the rotation of the pivotable gear 14' is continued and its jaw 14'c comes to meet the jaw 12'b of the ratchet member 12', the former is pushed back and pivoted counterclockwise so that its teeth 14'a may again engage with the front part of the teeth 12'c of the ratchet member 12' as shown in FIG. 7a.

It will be understood by those of ordinary skill in the art that any one of the embodiments herein described and illustrated may be modified or revised within the scope of the teachings of the present invention.

The present invention is not limited to the specific embodiments herein shown and described but departures may be made therefrom within the scope of the accompanying claims without departing from the principles of the invention.

INDUSTRIAL APPLICABILITY

As described above the present invention has an advantage in that a tilting angle of an armrest can be adjusted at predetermined angular intervals for the convenience of an occupant.

What is claim is:

1. An armrest tilting device, comprising;
   a housing comprising an outer panel with a supporting hole and an inner panel with a passage hole, the two panels of which are coupled with a gap therebetween and in parallel with each other;
   a ratchet member formed with a plurality of teeth and a jaw and arranged between said panels;
   a check member comprising a pivotable gear formed with a jaw and teeth for engaging with the jaw and the teeth of said ratchet member and a first torsion coil spring, for resiliently supporting said pivotable gear;
   a rotational shaft which is rotatably supported in the supporting hole of the outer panel of the housing and passes through the passage hole of the inner panel of the housing, carrying either the ratchet member or the pivotable gear and a rest bar of the armrest fixed on one end thereof;
   a pivoting control device comprising a fixed cam having a passage hole for receiving said rotational shaft therethrough , one side of which is attached to the outside of the inner panel of said housing and the other side of which is formed with two opposite recesses having a wall and a slant facing each other, a rotational cam fixedly mounted on said rotational shaft, one side of which faces the recesses of said fixed cam and is formed with two opposite protrusions having a wall and a slant for being engaged with the corresponding recesses of said fixed cam, and a second torsion coil spring wound around said rotational shaft and arranged and supported between said rotational cam and the other end of said rotational shaft for pressing said rotational cam against said fixed cam.

2. The armrest tilting device as claimed in claim 1, wherein said rotational shaft carries said ratchet member fixed thereon by a mounting hole of said ratchet member, said pivotable gear is pivotably mounted between said panels and said first torsion coil spring is hooked between said pivotable gear and either of said panels.

3. The armrest tilting device as claimed in claim 2, wherein a lower step is formed on a part of each top surface of the cam portion of said fixed cam so that the top surfaces of the protrusions of said rotational cam may be seated thereon and the protrusions of said rotational cam may be locked by the adjoining vertical surface of said step.

4. The armrest tilting device as claimed in claim 3, wherein a stopper for checking excessive pivotal movement of either or both of said ratchet member and said pivotable gear is provided by fixing means coupling said panels.

5. The armrest tilting device as claimed in claim 4, wherein said fixing means is a rivet.

6. The armrest tilting device as claimed in claim 2, wherein a stopper for checking excessive pivotal movement of either or both of said ratchet member and said pivotable gear is provided by fixing means coupling said panels.

7. The armrest tilting device as claimed in claim 6, wherein said fixing means is a rivet.

8. The armrest tilting device as claimed in claim 1, wherein said rotational shaft carries said pivotable gear by a support for said pivotable gear which is mounted thereon and to which said pivotable gear is pivotably fixed, said ratchet member is fixed on the inside of either or both of said panels, and said first torsion coil spring is hooked between said pivotable gear and said support for said pivotable gear.

9. The armrest tilting device as claimed in claim 8, wherein a lower step is formed on a part of each top surface of the cam portion of said fixed cam so that the top surfaces of the protrusions of said rotational cam may be seated thereon and the protrusions of said rotational cam may be locked by the adjoining vertical surface of said step.

10. The armrest tilting device as claimed in claim 9, wherein a stopper for checking excessive pivotal movement of either or both of said ratchet member and said pivotable gear is provided by fixing means coupling said panels.

11. The armrest tilting device as claimed in claim 10, wherein said fixing means is a rivet.

12. The armrest tilting device as claimed in claim 8, wherein a stopper for checking excessive pivotal movement of either or both of said ratchet member and said pivotable gear is provided by fixing means coupling said panels.

13. The armrest tilting device as claimed in claim 12, wherein said fixing means is a rivet.

14. The armrest tilting device as claimed in claim 1, wherein a lower step is formed on a part of each top surface of the cam portion of said fixed cam so that the top surfaces of the protrusions of said rotational cam may be seated thereon and the protrusions of said rotational cam may be locked by the adjoining vertical surface of said step.

15. The armrest tilting device as claimed in claim 14, wherein a stopper for checking excessive pivotal movement of either or both of said ratchet member and said pivotable gear is provided by fixing means coupling said panels.

16. The armrest tilting device as claimed in claim 15, wherein said fixing means is a rivet.

17. The armrest tilting device as claimed in claim 1 wherein, a stopper for checking excessive pivotal movement of either or both of said ratchet member and said pivotable gear is provided by a fixing means coupling said panels.

18. The armrest tilting device as claimed in claim 17, wherein said fixing means is a rivet.

* * * * *